(12) United States Patent
Nakahata et al.

(10) Patent No.: US 8,593,100 B2
(45) Date of Patent: Nov. 26, 2013

(54) MOTOR DRIVE CIRCUIT

(75) Inventors: Masahiro Nakahata, Gunma-ken (JP); Toshiyuki Imai, Gunma-ken (JP)

(73) Assignee: ON Semiconductor Trading, Ltd., Hamilton (BM)

( * ) Notice: Subject to any disclaimer, the term of this patent is extended or adjusted under 35 U.S.C. 154(b) by 307 days.

(21) Appl. No.: 13/091,229

(22) Filed: Apr. 21, 2011

(65) Prior Publication Data

US 2011/0260669 A1 Oct. 27, 2011

(30) Foreign Application Priority Data

Apr. 22, 2010 (JP) ................................. 2010-099173

(51) Int. Cl.
  *G05B 11/28* (2006.01)
(52) U.S. Cl.
  USPC ............................ 318/599; 318/811; 388/800
(58) Field of Classification Search
  USPC .......... 318/599, 432, 811; 388/800, 804, 806, 388/811, 815, 819, 823, 912
  See application file for complete search history.

(56) References Cited

U.S. PATENT DOCUMENTS

| 5,747,972 A * | 5/1998 | Baretich et al. ................. 323/223 |
| 7,019,506 B2 * | 3/2006 | Kernahan ....................... 323/284 |
| 7,595,613 B2 * | 9/2009 | Thompson et al. ............ 323/223 |
| 7,728,538 B2 * | 6/2010 | D'Angelo et al. ........ 318/400.02 |

FOREIGN PATENT DOCUMENTS

JP 2005-287196 A 10/2005

OTHER PUBLICATIONS

Patent Abstracts of Japan in Publication No. 2005-287196 Publication date Oct. 13, 2005 (14 pages).

* cited by examiner

*Primary Examiner* — Rina Duda
(74) *Attorney, Agent, or Firm* — Osha Liang LLP

(57) ABSTRACT

A motor drive circuit is configured to drive a motor coil based on duty ratio of a PWM signal, and includes a first pulse signal generating circuit configured to generate a first pulse signal for each time period, the time period being equal to 1/n of a time period during which the PWM signal is at one logic level, a counter configured to change a count value based on the first pulse signal, a drive signal output circuit configured to output a drive signal of one logic level when the count value is not a predetermined value and output the drive signal of the other logic level when the count value reaches the predetermined value, a drive circuit configured to perform PWM driving for the motor coil based on the duty ratio of the drive signal, and a setting circuit.

5 Claims, 14 Drawing Sheets

| OUTPUT OF UP-COUNTER 81 (4 BITS) | | | | | OUTPUT OF CONVERTING CIRCUIT 82 (3 BITS) | | | |
|---|---|---|---|---|---|---|---|---|
| DECIMAL NUMBER | A0 | A1 | A2 | A3 | DECIMAL NUMBER | B0 | B1 | B2 |
| 0 | 0 | 0 | 0 | 0 | 0 | 0 | 0 | 0 |
| 1 | 0 | 0 | 0 | 1 | 1 | 0 | 0 | 1 |
| 2 | 0 | 0 | 1 | 0 | 2 | 0 | 1 | 0 |
| 3 | 0 | 0 | 1 | 1 | 3 | 0 | 1 | 1 |
| 4 | 0 | 1 | 0 | 0 | 4 | 1 | 0 | 0 |
| 5 | 0 | 1 | 0 | 1 | 5 | 1 | 0 | 1 |
| 6 | 0 | 1 | 1 | 0 | 6 | 1 | 1 | 0 |
| 7 | 0 | 1 | 1 | 1 | 7 | 1 | 1 | 1 |
| 8 | 1 | 0 | 0 | 0 | 7 | 1 | 1 | 1 |
| 9 | 1 | 0 | 0 | 1 | 6 | 1 | 1 | 0 |
| 10 | 1 | 0 | 1 | 0 | 5 | 1 | 0 | 1 |
| 11 | 1 | 0 | 1 | 1 | 4 | 1 | 0 | 0 |
| 12 | 1 | 1 | 0 | 0 | 3 | 0 | 1 | 1 |
| 13 | 1 | 1 | 0 | 1 | 2 | 0 | 1 | 0 |
| 14 | 1 | 1 | 1 | 0 | 1 | 0 | 0 | 1 |
| 15 | 1 | 1 | 1 | 1 | 0 | 0 | 0 | 0 |

FIG. 14

MOTOR DRIVE CIRCUIT

CROSS-REFERENCE TO RELATED APPLICATION

This application claims the benefit of priority to Japanese Patent Application No. 2010-099173, filed Apr. 22, 2010, of which full contents are incorporated herein by reference.

BACKGROUND OF THE INVENTION

1. Field of the Invention

The present invention relates to a motor drive circuit.

2. Description of the Related Art

In electronic devices, fan motors are employed in order to cool heat-generating components. When driving the fan motor, a motor drive circuit for performing so-called soft-switching may be used that a drive current of a motor coil is gradually changed so as to reduce noise in the fan motor, for example (see, e.g., Japanese Patent Laid-Open Publication No. 2005-287196). The motor drive circuit according to the above publication is a motor drive circuit of a PWM (Pulse Width Modulation) system and the motor coil is driven based on a PWM signal. In such a motor drive circuit, the drive current of the motor coil can be changed with the duty ratio of the PWM signal being changed (see Japanese Patent Laid-Open Publication No. 2005-287196).

In the motor drive circuit according to the above publication, a charging voltage of a capacitor and a triangle wave are compared, to generate the PWM signal. Therefore, in order to change the duty ratio of the PWM signal in a slow manner, it is necessary to change the charging voltage of the capacitor in a slow manner. Thus, such a motor drive circuit requires a large-capacity capacitor, for example.

SUMMARY OF THE INVENTION

A motor drive circuit according to an aspect of the present invention, includes: A motor drive circuit to drive a motor coil based on duty ratio of a PWM signal, comprising: a first pulse signal generating circuit to generate a first pulse signal for each time period, the time period being equal to 1/n of a time period during which the PWM signal is at one logic level; a counter to change a count value based on the first pulse signal; a drive signal output circuit to output a drive signal of one logic level when the count value is not a predetermined value, and output the drive signal of the other logic level when the count value reaches the predetermined value; a drive circuit to perform PWM driving for the motor coil based on the duty ratio of the drive signal; and a setting circuit to set, in the counter, such a count value as to decrease a current passing through the motor coil, for each period of the PWM signal, in a time period during which the current passing through the motor coil is decreased, and set, in the counter, such a count value as to increase the current passing through the motor coil, for each period of the PWM signal, in a time period during which the current passing through the motor coil is increased, out of a time period during which the current passing through the motor coil is changed in direction.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 14 is a diagram of a relationship between an output of an up-counter 81 and an output of a converting circuit 82;

DETAILED DESCRIPTION OF THE INVENTION

At least the following details will become apparent from descriptions of this specification and of the accompanying drawings.

Figure 1:
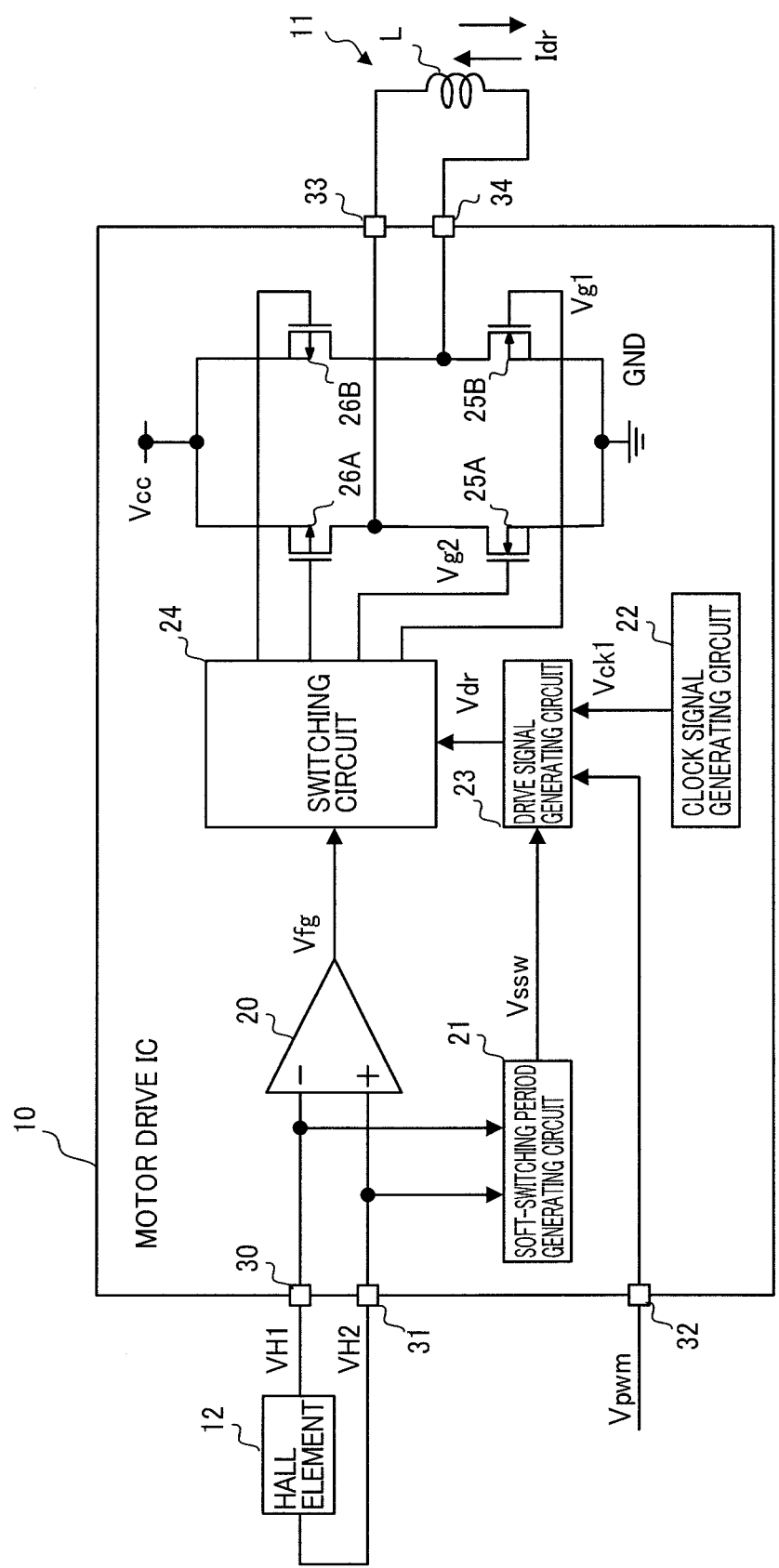
FIG. 1 is a diagram illustrating a configuration of a motor drive IC 10 according to one embodiment of the present invention.

FIG. 1 illustrates a configuration of a motor drive IC (Integrated Circuit) 10 according to one embodiment of the present invention. The motor drive IC 10 is included in a fan motor for cooling heat-generating components, such as a processor, in electronic devices such as a notebook personal computer, for example.

The motor drive IC 10 is a circuit configured to drive a single-phase motor 11 to rotate a cooling fan according to the duty ratio of a PWM signal Vpwm to be output from a microcomputer (not shown), etc. The motor drive IC 10 includes a comparator 20, a soft-switching period generating circuit 21, a clock signal generating circuit 22, a drive signal generating circuit 23, a switching circuit 24, NMOS transistors 25A and 25B, PMOS transistors 26A and 26B, and terminals 30 to 34. The motor drive IC 10 increases a rotation speed of the single-phase motor 11 with an increase in the duty ratio of the high level of the PWM signal Vpwm.

A hall element 12 outputs hall signals VH1 and VH2 based on a rotational position of a rotor (not shown) in the single-phase motor 11. The hall element 12 outputs the hall signals VH1 and VH2 whose frequencies change according to the rotation speed of the fan motor and whose phases are opposite to each other. The hall signals VH1 and VH2 are sinusoidal signals whose amplitude levels and center amplitude levels are equal to each other, and are output to the terminals 30 and 31, respectively.

The comparator 20 compares levels of the hall signals VH1 and VH2, and generates a signal Vfg whose frequency changes according to the rotation speed of the single-phase motor 11. The signal Vfg is a so-called FG signal that goes to a low level (hereinafter, referred to as L level) when the level of the hall signal VH1 is higher than that of the hall signal VH2, and goes to a high level (hereinafter, referred to as H level) when the level of the hall signal VH1 is lower than that of the hall signal VH2.

Figure 2:
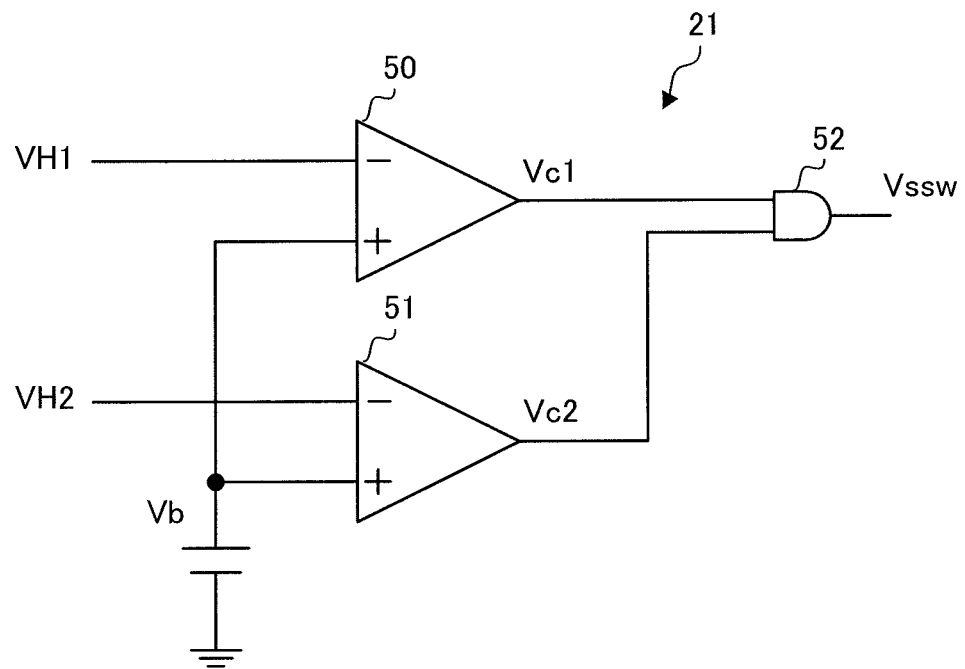
FIG. 2 is a diagram illustrating one embodiment of a soft-switching period generating circuit 21.

The soft-switching period generating circuit 21 generates a signal Vssw indicative of a soft-switching period, that is, a time period for slowly changing the direction of a drive current Idr passing through a motor coil L of the single-phase motor 11. FIG. 2 illustrates a configuration example of the soft-switching period generating circuit 21. The soft-switching period generating circuit 21 generates the signal Vssw based on a voltage Vb generated in the soft-switching period generating circuit 21 and the hall signals VH1 and VH2, and includes comparators 50, 51 and an AND circuit 52.

Figure 3:
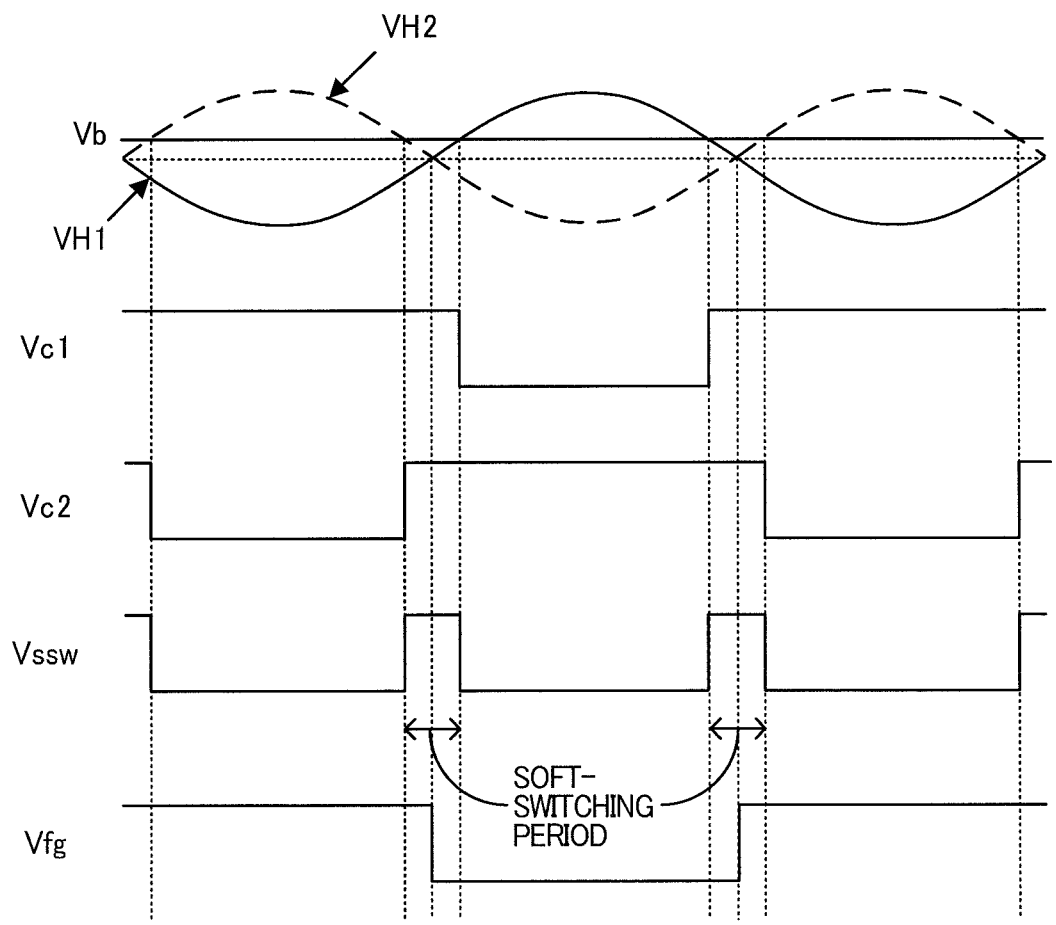
FIG. 3 is a diagram illustrating an operation of a soft-switching period generating circuit 21.

The comparator 50 compares the levels between the hall signal VH1 and a predetermined voltage Vb. Specifically, as shown in FIG. 3, the comparator 50 outputs a low level comparison signal Vc1 when the level of the hall signal VH1 is higher than that of the voltage Vb, and outputs a high level comparison signal Vc1 when the level of the hall signal VH1 is lower than that of the voltage Vb.

The comparator 51 compares the levels between the hall signal VH2 and the predetermined voltage Vb. The comparator 51 outputs a low level comparison signal Vc2 when the level of the hall signal VH2 is higher than that of the voltage Vb, and outputs a high level comparison signal Vc2 when the level of the hall signal VH2 is lower than that of the voltage Vb.

The AND circuit 52 performs logical AND of the comparison signal Vc1 and the comparison signal Vc2, and outputs an operation result thereof as the signal Vssw. Thus, the soft-switching period generating circuit 21 generates the signal Vssw that goes high, in the time period around the timing of crossing of the hall signals VH1 and VH2. In an embodiment of the present invention, the soft-switching period indicates the time period during which the signal Vssw goes high. The hall signals VH1 and VH2, which vary sinusoidally as described above, are equal in dc level at the amplitude centers thereof. Therefore, in the time period during which the signal Vssw is high, the time period before the timing of the crossing of the hall signals VH1 and VH2 becomes equal to that after the timing thereof.

A clock signal generating circuit 22 generates a clock signal Vck1 with a predetermined period. A design is such that the frequency of the clock signal Vck1 is rendered sufficiently higher than that of the PWM signal Vpwm.

The drive signal generating circuit 23 generates a drive signal Vdr to cause the switching circuit 24 to perform PWM-driving for the NMOS transistor 25A, etc. The drive signal generating circuit 23 generates the drive signal Vdr whose duty ratio is such a duty ratio as to coincide with that of the PWM signal Vpwm, in a case where the signal Vssw is low, i.e., not in the soft-switching period. On the other hand, the drive signal generating circuit 23 generates the drive signal Vdr whose duty ratio gradually is decreased, and thereafter is gradually increased in a case where the signal Vssw is high, i.e., in the soft-switching period. The drive signal generating circuit 23 will be described later in detail.

The switching circuit 24 drives the NMOS transistors 25A and 25B and the PMOS transistors 26A and 26B, which make up the so-called H-bridge circuit, based on the signal Vfg and the drive signal Vdr. Specifically, the switching circuit 24 controls on/off of the MOS transistors of the H-bridge circuit so as to change the drive current Idr for driving the motor coil L. When the signal Vfg is high, for example, the switching circuit 24 turns on the PMOS transistor 26A and turns off the NMOS transistor 25A and the PMOS transistor 26B, as well as performs switching of the NMOS transistor 25B according to the duty ratio of the drive signal Vdr. Thus, the drive current Idr passes through the motor coil L of the single-phase motor 11 in the direction from the terminal 33 to the terminal 34. When the signal Vfg is low, for example, the switching circuit 24 turns on the PMOS transistor 26B and turns off the NMOS transistor 25B and the PMOS transistor 26A, as well as performs switching of the NMOS transistor 25A according to the duty ratio of the drive signal Vdr. Thus, the drive current Idr passes through the motor coil L in the direction from the terminal 34 to the terminal 33.

The switching circuit 24 and the NMOS transistors 25A and 25B and the PMOS transistors 26A and 26B, which make up the H-bridge circuit, correspond to a drive circuit.

<Details of Drive Signal Generating Circuit 23>

The drive signal generating circuit 23 will be described in detail with reference to FIG. 4. The drive signal generating circuit 23 includes pulse signal generating circuits 60 and 61, a counter 62, a drive signal generating circuit 63, a count value setting circuit 64, and a count value output circuit 65. The count value setting circuit 64 and the count value output circuit 65 correspond to a setting circuit.

In the case where the signal Vssw is low, i.e., not in the soft-switching period, the pulse signal generating circuit 60 (first pulse signal generating circuit) generates a pulse signal Vp1 (first pulse signal), which goes high each time the PWM signal Vpwm is changed from the H level to the L level. In the case where the signal Vssw is high, that is, in the soft-switching period, the pulse signal generating circuit 60 generates the pulse signal Vp1 for each time period which is equal to, for example, ⅛ of the time period during which the PWM signal Vpwm is high.

Figure 5:
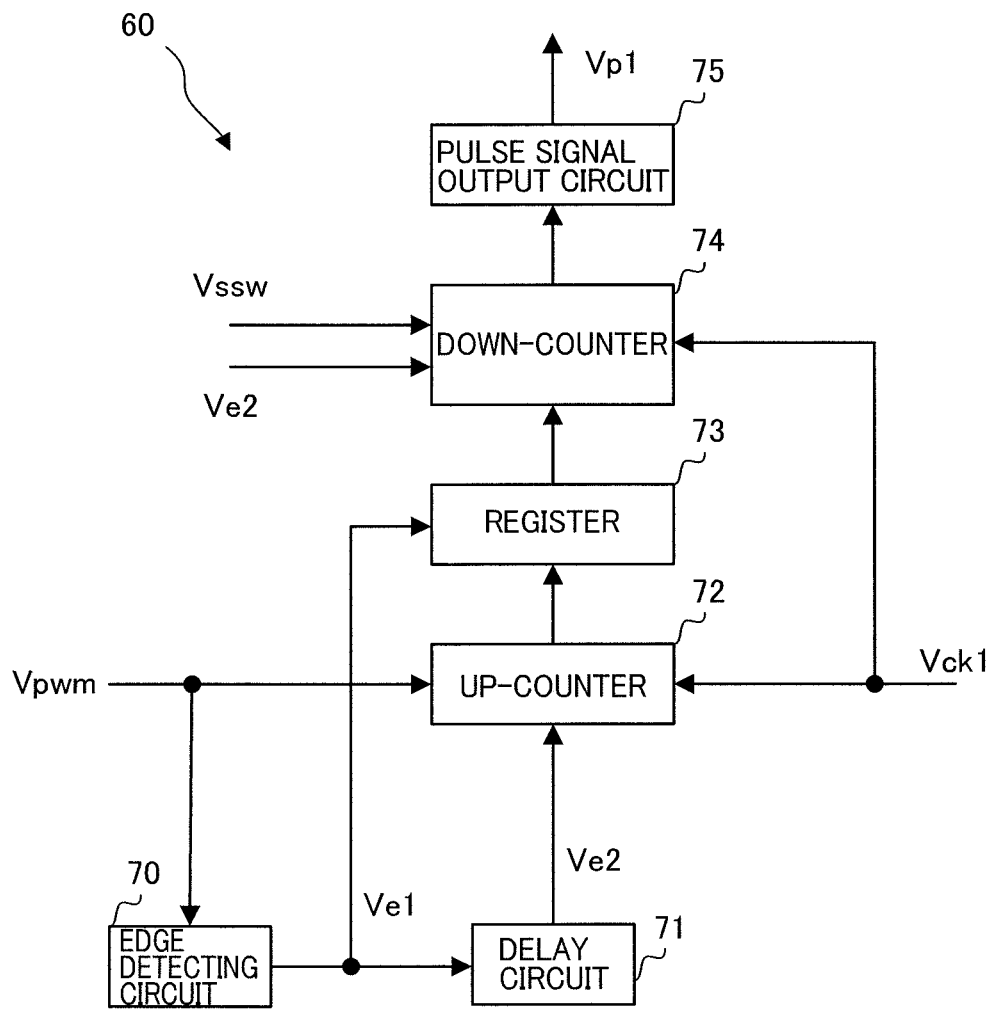
FIG. 5 is a diagram illustrating one embodiment of a pulse signal generating circuit 60.

The pulse signal generating circuit 60 includes an edge detecting circuit 70, a delay circuit 71, an up-counter 72, a register 73, a down-counter 74, and a pulse signal output circuit 75, as shown in FIG. 5.

The edge detecting circuit 70 detects a rising edge of the PWM signal Vpwm, and outputs an edge pulse Ve1.

The delay circuit 71 delays the edge pulse Ve1 by a predetermined time, to be output as an edge pulse Ve2. A design is such that the delay time at the delay circuit 71 is sufficiently shorter than the period of the clock signal Vck1.

The up-counter 72 counts up based on the clock signal Vck1 during the time period during which the PWM signal Vpwm is high. The up-counter 72 is an 8-bit counter, for example, and the count value of the up-counter 72 is reset when the edge pulse Ve2 is input thereto.

Figure 6:
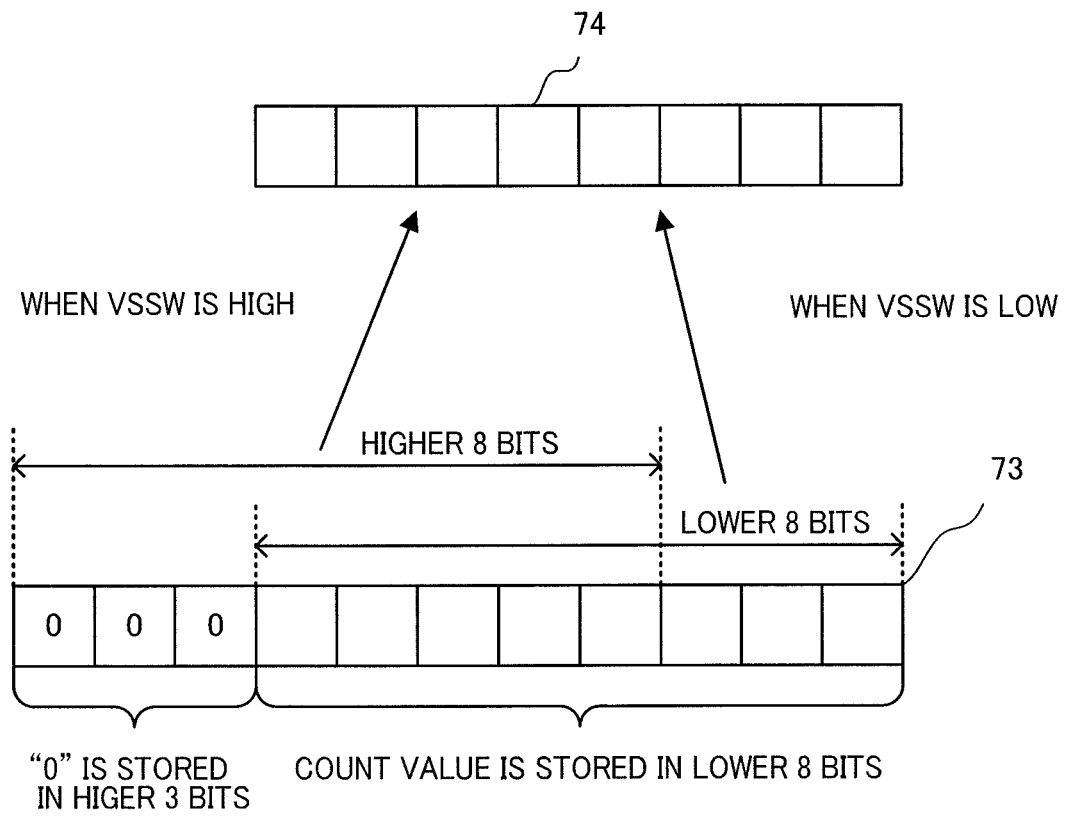
FIG. 6 is a diagram illustrating a count value to be stored in a down-counter 74.

The register 73 is an 11-bit register as shown in FIG. 6, for example, and when the edge pulse Ve1 is input thereto, the register 73 acquires the count value of the up-counter 72, i.e., the count value indicative of the time period during which the PWM signal Vpwm is high, and stores the acquired value in lower 8 bits. "0" (binary number) is stored in higher 3 bits of the register 73. Hereinafter, it is assumed that the count value, etc., are values expressed in a decimal number unless specifically indicated as a binary number.

In the case where the signal Vssw is low, the down-counter 74, when the edge pulse Ve2 is input thereto, reads lower 8-bit data of the register 73, to be stored as an initial value. The down-counter 74 keeps counting down from the initial value based on the clock signal Vck1. Specifically, in a case where "160" is stored in the lower 8 bits of the register 73, for example, the initial value is "160". The down-counter 74 counts down from "160" based on the clock signal Vck1.

When the count value reaches "0", the down-counter 74 counts down again from "160", which has been set as the initial value.

On the other hand, in the case where the signal Vssw is high, the down-counter 74, when the edge pulse Ve2 is input thereto, reads out higher 8-bit data of the register 73, to be stored as an initial value. As described above, all of the higher 3 bits of the register 73 are "0". Therefore, the count value stored in the register 73 is shifted to the right by 3 bits. For example, if "160" is stored in the lower 8 bits of the register 73, the count value "20" obtained by dividing "160" by eight (cube of two) is the initial value. The down-counter 74 in the case where the signal Vssw is high counts down from the initial value based on the clock signal Vck1, as in the case where the signal Vssw is low. When the count value reaches "0", the down-counter 74 counts down again from "20", which has been set as the initial value.

The pulse signal output circuit 75 outputs the high level pulse signal Vp1 each time the count value of the down-counter 74 reaches "0".

Figure 7:
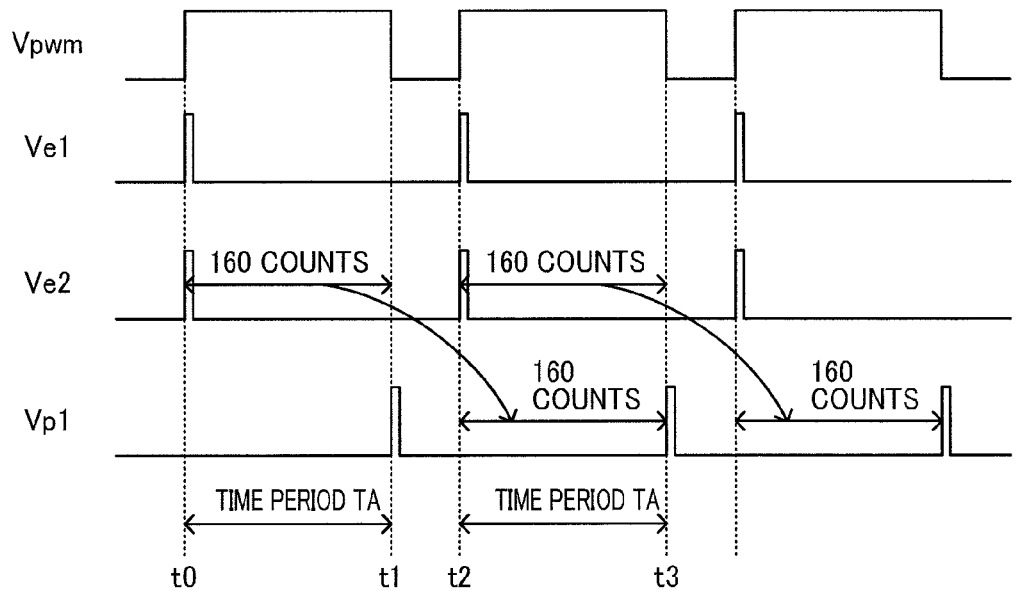
FIG. 7 is a diagram illustrating an operation of a pulse signal generating circuit 60 when a signal Vssw is low.

A description will now be given, with reference to FIG. 7, of an operation of the pulse signal generating circuit 60 in the case where the signal Vssw is low. Although in reality the edge pulse Ve2 is output after the output of the edge pulse Ve1, a design is such that the delay time of the delay circuit 71 is sufficiently shorter than the period of the clock signal Vck1. Therefore, in FIG. 7, the edge pulses Ve1 and Ve2 are drawn at the same time, for the sake of convenience.

First, when the PWM signal Vpwm goes high at time t0, the edge pulse Ve1 is output, and then the edge pulse Ve2 is output. Thus, the count value of the up-counter 72 is reset. Thereafter, the up-counter 72 counts up based on the clock signal Vck1, until time t1 when the PWM signal goes low. The count value to be reached by counting of the up-counter 72 in a time period TA from time t0 until time t1 is given as "160", for example.

Then, at time t2 after one period of the PWM signal Vpwm from time t0, the edge pulse Ve1 is output, and therefore the count value "160", reached by counting of the up-counter 72 from time t0 until time t1, is stored in the register 73. Since the signal Vssw to be input to the down-counter 74 is low, the down-counter 74 stores "160", which has been stored in the register 73, as the initial value based on the edge pulse Ve2. Then, the down-counter 74 starts counting down based on the clock signal Vck1. The clock signal Vck1 based on which the down-counter 74 counts down is identical with the clock signal Vck1 based on which the up-counter 72 counts up. Therefore, at time t3 at which the time period TA has elapsed from time t2, the count value of the down-counter 74 reaches "0", and as a result, the pulse signal Vp1 is output at time t3.

Thus, in the case where the signal Vssw is low, i.e., not in the soft-switching period, the pulse signal generating circuit 60 generates the pulse signal Vp1, which goes high each time the PWM signal Vpwm is changed from the H level to the L level.

Figure 8:
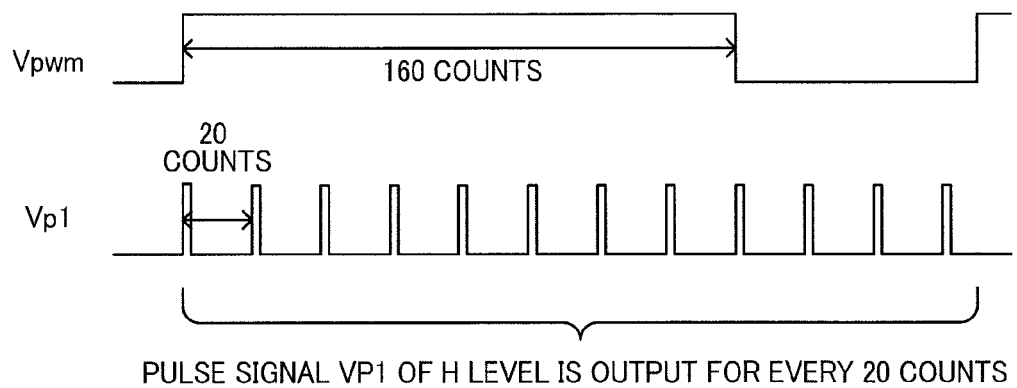
FIG. 8 is a diagram illustrating an operation of a pulse signal generating circuit 60 a signal Vssw is high.

Although the description has been given of the operation of the pulse signal generating circuit 60 in the case where the signal Vssw is low, the operation thereof in the case where the signal Vssw is high is the same except that the initial value of the down-counter 74 is ⅛. For example, in a case where the count value of the up-counter 72 is "160" for the time period during which the PWM signal Vpwm is high, and "160" is stored in the register 73, "20" (20=160/8) is stored in the down-counter 74 as an initial value. The down-counter 74 counts down from "20" as the initial value based on the clock signal Vck1. Thus, the count value of the down-counter 74 reaches "0" in each time period, which is equal to ⅛ of the time period during which the PWM signal Vpwm is high, that is, the time period until when "160" has been reached based on the clock signal Vck1. Therefore, as shown in FIG. 8, in the case where the signal Vssw is high, the pulse signal generating circuit 60 generates the pulse signal Vp1 for each time period, which is equal to ⅛ of the time period during which the PWM signal Vpwm is high.

Figure 4:
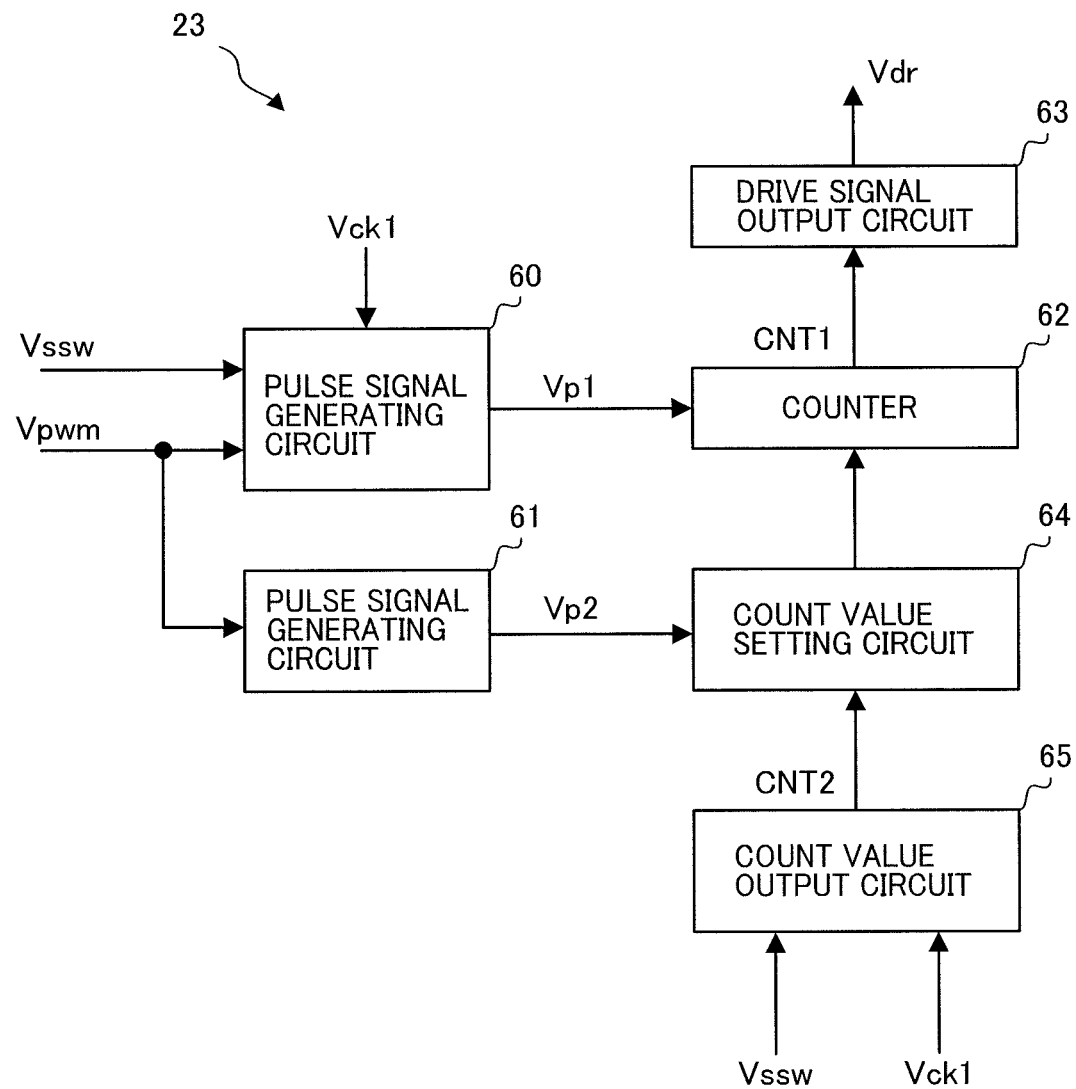
FIG. 4 is a diagram illustrating one embodiment of a drive signal generating circuit 23.

The pulse signal generating circuit 61 shown in FIG. 4 generates a pulse signal Vp2, which goes high each time the PWM signal Vpwm is changed from the L level to the H level. That is, the pulse signal generating circuit 61 detects the rising of the PWM signal Vpwm, to generate the pulse signal Vp2 for each period of the PWM signal Vpwm.

The counter 62 increments a count value CNT1 by "1" each time the pulse signal Vp1 is input thereto. The counter 62 is a 3-bit up-counter, for example, and stops changing the count value CNT1 when the count value CNT1 reaches a maximum value of "7".

The drive signal output circuit 63 outputs the low level drive signal Vdr when the count value CNT1 is "7" (predetermined value), and outputs the high level drive signal Vdr when the count value CNT1 is other than "7".

The count value setting circuit 64 sets at the counter 62 a count value CNT2 to be output from the count value output circuit 65, each time the pulse signal Vp2 is output.

The count value output circuit 65 (generating circuit) outputs the initial value to be set at the counter 62 as the count value CNT2. In the case where the signal Vssw is low, the count value output circuit 65 outputs such a count value CNT2 that the duty ratio of the H level of the drive signal Vdr becomes identical with that of the PWM signal Vpwm. Specifically, the count value output circuit 65 outputs "6" as the count value CNT2. On the other hand, in the case where the signal Vssw is high, the count value output circuit 65 outputs such a count value CNT2 that the duty ratio of the H level of the drive signal Vdr is decreased and thereafter is increased.

A description will hereinafter be given of how the duty ratio of the drive signal Vdr changes according to the initial value to be set at the counter 62. The count value output circuit 65 will be described later in detail.

Figure 9:
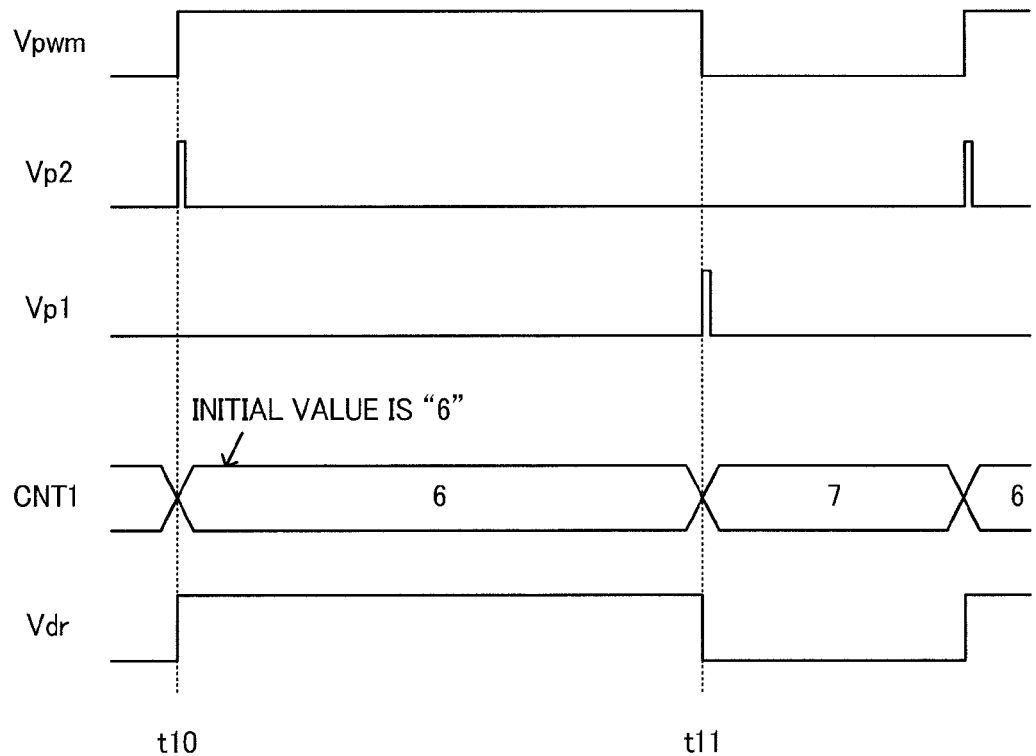
FIG. 9 is a diagram illustrating a drive signal Vdr when a signal Vssw is low.

First, a description will be given of a case where the initial value of the count value CNT1 is "6" when the signal Vssw is low, with reference to FIGS. 4 and 9. When the PWM signal Vpwm goes high at time t10, the pulse signal Vp2 is output. Thus, "6" is set at the counter 62 as the count value CNT1. At this time, since the count value CNT1 is not "7", the drive signal Vdr goes high. When the PWM signal Vpwm goes low at time t11, the pulse signal Vp1 is output. Thus, the count value CNT1 is changed from "6" to "7", and the drive signal Vdr is changed from the H level to the L level. As such, in the case where the signal Vssw is low, the drive signal output circuit 63 outputs the drive signal Vdr with such a duty ratio as to coincide with the duty ratio of the PWM signal Vpwm.

Figure 10:
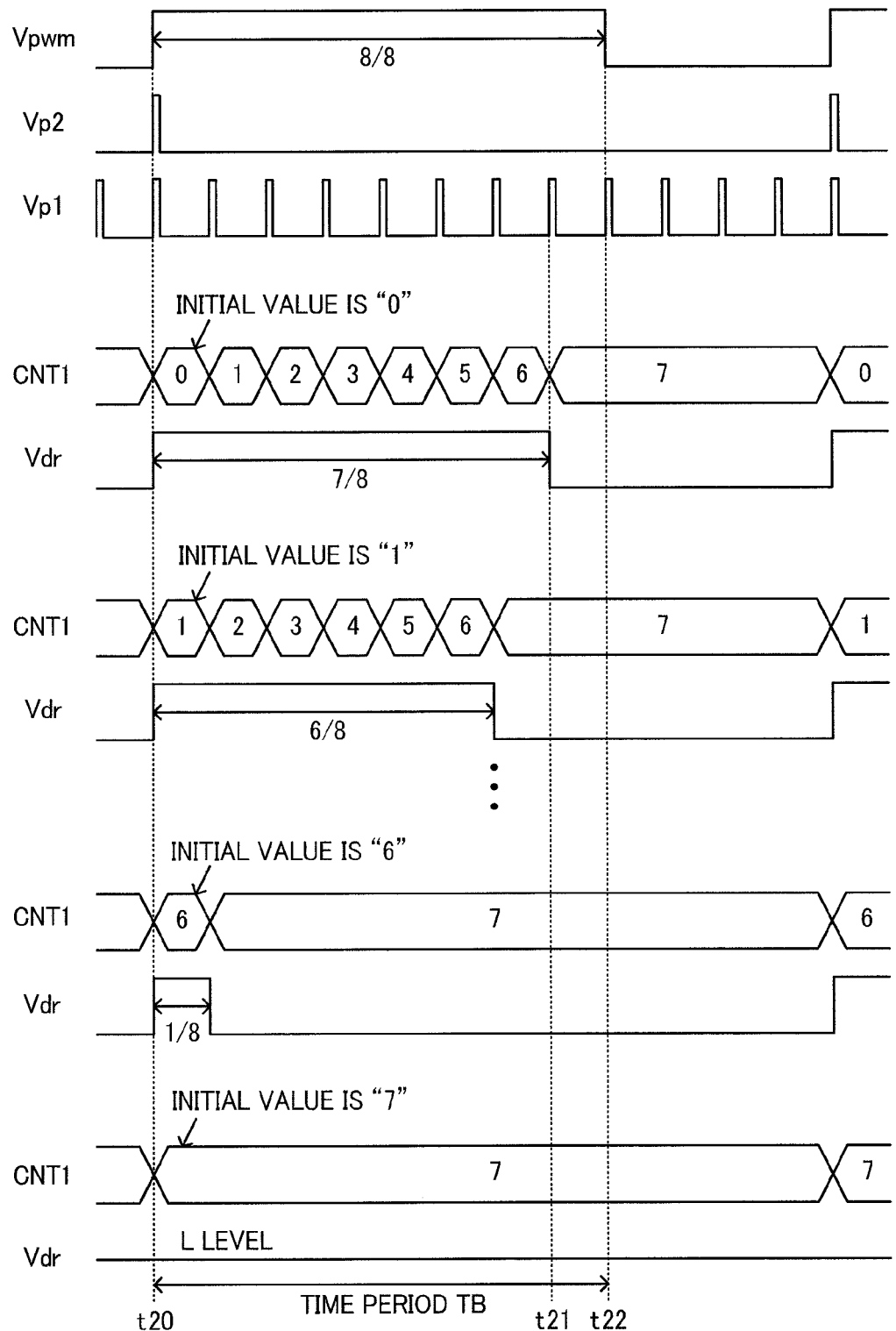
FIG. 10 is a diagram illustrating a change of a drive signal Vdr when a signal Vssw is high.

Subsequently, a description will be given of the drive signal Vdr in the case where the initial value of the count value CNT1 is "0" when the signal Vssw is high, with reference to FIG. 10. As described above, when the signal Vssw is high, the pulse signal Vp1 is output for each time period, which is equal to ⅛ of the time period during which the PWM signal Vpwm is high.

When the PWM signal Vpwm goes high and the pulse signal Vp2 is output at time 20, "0" is set at the counter 62. Thereafter, the counter 62 counts up each time the pulse signal Vp1 is output thereto. At time t21, at which the pulse signal Vp1 is output seven times from time t20, the count value CNT1 reaches "7". As a result, the drive signal Vdr is changed from the H level to the L level at time 21. The time period during which the drive signal Vdr is high (time t20 to t21) is a duration, which is equal to ⅞ of that of the time period during which the PWM signal Vpwm is high.

Further, for example, a case where the initial value of the count value CNT1 is "1" is similar to the case where the initial value of the count value CNT1 is "0". In this case, however, since "1" is set at the counter 62 at time t20, the count value CNT1 reaches "7" when the pulse signal Vp1 is output six times from time t20. Therefore, in the case where the initial value of the count value CNT1 is "1", the time period during which the drive signal Vdr is high is a duration, which is equal to ⅝ of that of a time period TB. Thus, if the initial value of the count value CNT1 is increased by "1", the time period during which the drive signal Vdr is high is shortened by "a time period which is equal to ⅛ of the time period TB". For example, in a case where the initial value of the count value CNT1 is "7", the maximum value of "7" is set at the counter 62, and therefore the drive signal Vdr is constantly low.

<Details of Count Value Output Circuit 65>

Figure 11:
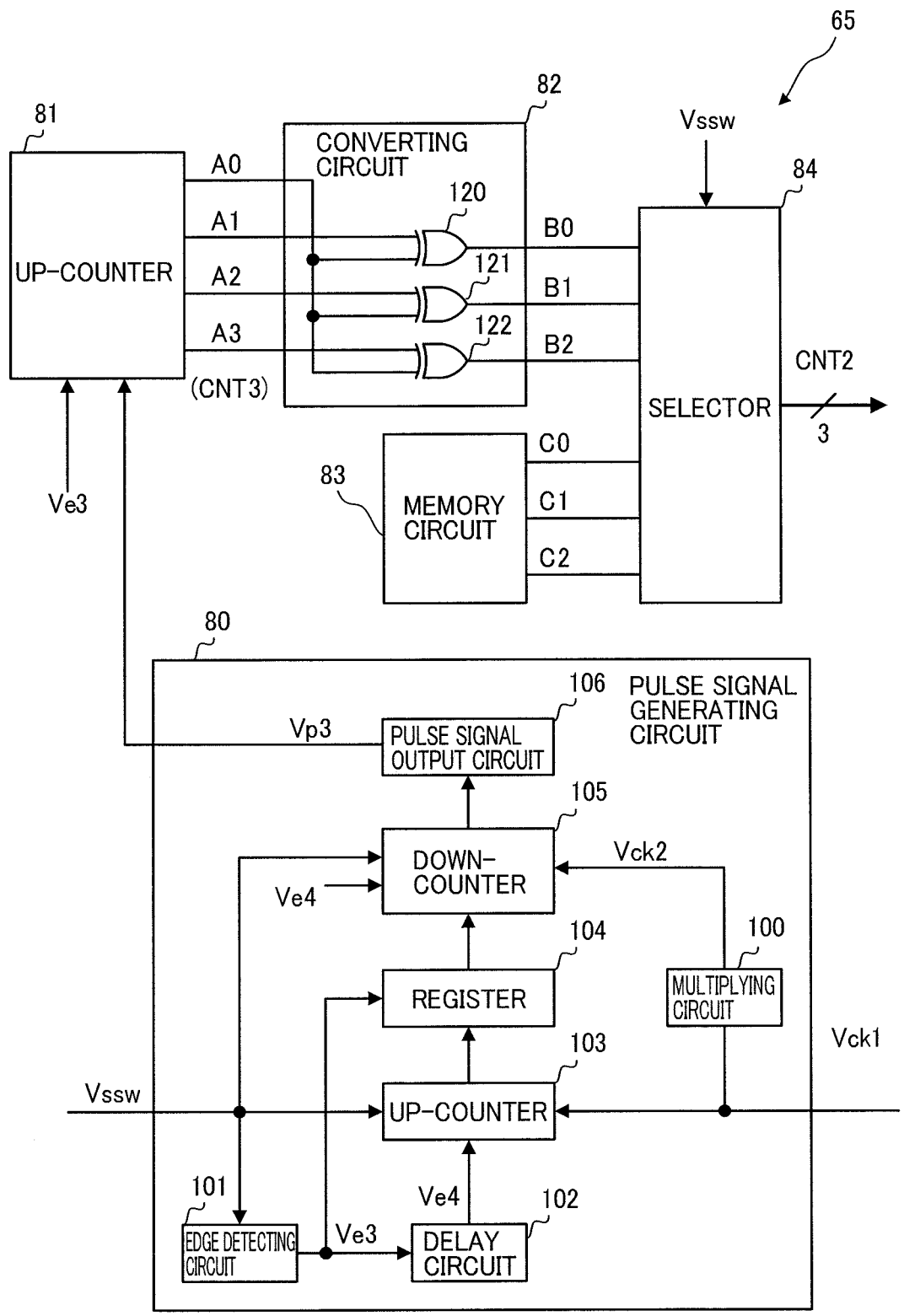
FIG. 11 is a diagram illustrating one embodiment of a count value output circuit 65.

A description will now be given of the count value output circuit 65 in detail with reference to FIG. 11. The count value output circuit 65 outputs "6" as the count value CNT2 in the case where the signal Vssw is low, and increases the count value CNT2, for example, from "0" to "7" and thereafter decreases it from "7" to "0" in the case where the signal Vssw is high.

The count value output circuit 65 includes a pulse signal generating circuit 80, an up-counter 81, a converting circuit 82, a memory circuit 83, and a selector 84.

The pulse signal generating circuit 80 (second pulse signal generating circuit) is a circuit configured to generate a pulse signal Vp3 (second pulse signal) for each time period, which is equal to, for example, 1/16 of the time period during which the signal Vssw is high. The pulse signal generating circuit 80 includes a multiplying circuit 100, an edge detecting circuit 101, a delay circuit 102, an up-counter 103, a register 104, a down-counter 105, and a pulse signal output circuit 106.

The multiplying circuit 100 outputs a clock signal Vck2 having a frequency 16 times that the frequency of the clock signal Vck1, based on the clock signal Vck1.

The edge detecting circuit 101 detects the rising edge of the signal Vssw, and outputs an edge pulse Ve3.

The delay circuit 102 delays the edge pulse Ve3 by a predetermined time, to be output as an edge pulse Ve4. It is assumed that the delay time in the delay circuit 102 is to sufficiently shorter than the period of the clock signal Vck2.

The up-counter 103 counts up in the time period during which the signal Vssw is high, based on the clock signal Vck1. The up-counter 103 is a 9-bit counter, for example, and the count value of the up-counter 103 is reset when the edge pulse Ve4 is input thereto.

The register 104 is a 9-bit register, for example, and acquires and stores the count value of the up-counter 103, i.e., the count value indicative of the time period during which the signal Vssw is high, when the edge pulse Ve3 is input thereto.

The down-counter 105 reads the count value stored in the register 104, to be stored as the initial value, when the edge pulse Ve4 is input thereto. The down-counter 105 keeps counting down from the initial value based on the clock signal Vck2. Specifically, for example, in a case where the count value is "480" which is reached by up-counting of the up-counter 103 based on the clock signal Vck1 and "480" is stored in the register 104, the initial value is "480". The down-counter 105 counts down from "480" based on the clock signal Vck2. When the count value reaches "0", the down-counter counts down again from "480", which has been set as the initial value. The frequency of the clock signal Vck2 is 16 times the frequency of the clock signal Vck1. Thus, the count value of the down-counter 105 reaches "0" for each time period, which is equal to 1/16 of a time period TC during which "480" is reached by counting of the up-counter 103.

Figure 12:
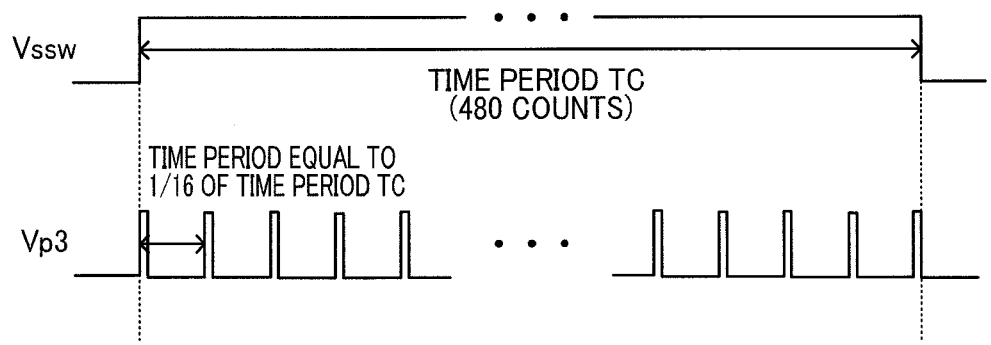
FIG. 12 is a diagram illustrating a pulse signal Vp3 to be output from a pulse signal generating circuit 80.

The pulse signal output circuit 106 outputs the high level pulse signal Vp3 each time the count value of the down-counter 105 reaches "0". Thus, the pulse signal generating circuit 80 generates the pulse signal Vp3 for each time period, which is equal to 1/16 of the time period during which the signal Vssw is high, as shown in FIG. 12.

Figure 13:
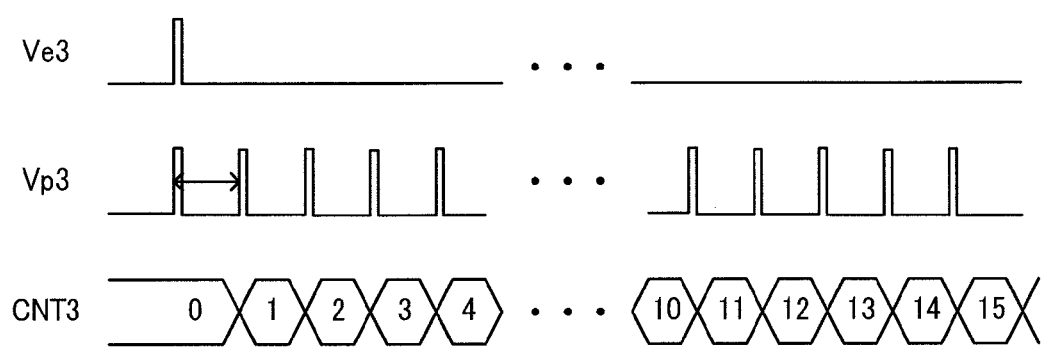
FIG. 13 is a diagram illustrating an operation of an up-counter 81.

The up-counter 81 is a 4-bit counter that counts up based on the pulse signal Vp3. A count value CNT3 of the up-counter 81 is reset when the edge pulse Ve3 is input thereto, that is, when the rising of the signal Vssw is detected. Thus, the count value CNT3 of the up-counter 81 is changed from "0" to "15", for example, as shown in FIG. 13. With respect to the count value CNT3, a 4-bit signal is output as signals A0 to A3, and out of the 4-bit signal A0 to A3, the signal A0 corresponds to a signal of the most significant bit, and the signal A3 corresponds to a signal of the least significant bit.

The converting circuit 82 is a circuit configured to convert the 4-bit count value output from the up-counter 81 into a 3-bit value and output the converted value, and includes EOR circuits 120 to 122. The signals A0 and A1 are input to the EOR circuit 120, the signals A0 and A2 are input to the EOR circuit 121, and the signals A0 and A3 are input to the EOR circuit 122. Thus, in a case where the signal A0 is "0" (binary number), the signals A1 to A3 are output from the EOR circuits 120 to 122 as signals B0 to B2, respectively. On the other hand, in a case where the signal A0 is "1" (binary number), the signals A1 to A3 whose logic levels are inverted are output as the signals B0 to B2. Thus, the converting circuit 82 outputs such a value as to be increased from "0" to "7" and then be decreased from "7" to "0" as the count value CNT3 is increased from "0" to "15", as shown in FIG. 14.

The memory circuit 83 stores 3-bit data indicative of a value of "6" as well as outputs a 3-bit signal C0 to C2 indicative of the value of "6".

The selector 84 outputs the signal C0 to C2 as the count value CNT2 in the case where the signal Vssw is low, and outputs the signal B0 to B2 as the count value CNT2 in the case where the signal Vssw is high.

As such, the count value output circuit 65 outputs "6" as the count value CNT2 in the case where the signal Vssw is low, and increases the count value CNT2 from "0" to "7" and thereafter decreases it from "7" to "0" in the case where the signal Vssw is high.

<Operation of Drive Signal Generating Circuit 23>

Figure 15:
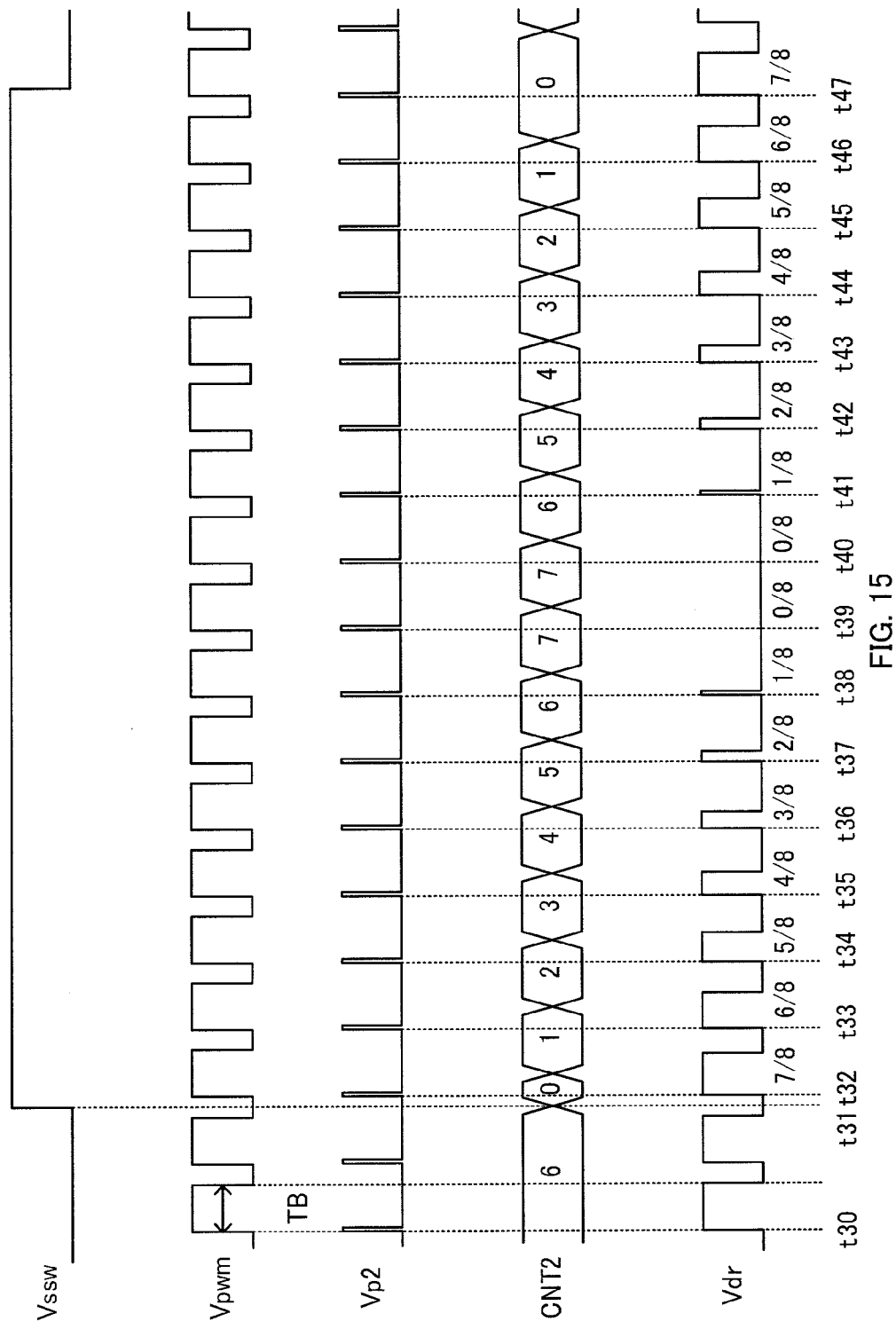
FIG. 15 is a diagram illustrating an operation of a drive signal generating circuit 23.

A description will now be given of an example of an operation of the drive signal generating circuit 23 with reference to FIGS. 4 and 15.

First, in the case where the signal Vssw is low, the count value output circuit 65 keeps outputting "6" as the count value CNT2. When the PWM signal Vpwm goes high at time t30, "6" is set as the initial value of the counter 62. Thereafter, when the PWM signal Vpwm is changed from the H level to the L level, the pulse signal Vp1 is output, and thus the count value CNT1 of the counter 62 reaches "7". Therefore, the drive signal generating circuit 23 outputs the drive signal Vdr whose duty ratio coincides with the duty ratio of the PWM signal Vpwm. While the signal Vssw is low, the drive signal generating circuit 23 keeps outputting the drive signal Vdr whose duty ratio coincides with the duty ratio of the PWM signal Vpwm.

Subsequently, when the signal Vssw goes high at time t31, the count value output circuit 65 outputs "0" as the count value CNT2, as described above. When the PWM signal Vpwm goes high at time t32, the pulse signal Vp2 is output, and thus "0" is set in the counter 62. In the case where the signal Vssw is high and the initial value of the count value CNT1 of the counter 62 is "0", the time period during which the drive signal Vdr is high results in the duration, which is equal to ⅞ of that of the time period TB during which the PWM signal Vpwm is high, as shown in FIG. 10. Thus, the duty ratio of the drive signal Vdr generated at time 32 is lower than that of the PWM signal Vpwm.

When the PWM signal Vpwm goes high at time t33, the pulse signal Vp2 is generated and "1" is set in the counter 62. As described above, when the initial count value CNT1 is "1", the time period during which the drive signal Vdr is high results in the duration, which is equal to 6/8 of that of the time period TB during which the PWM signal Vpwm is high. From time t34 until time t38, the initial count value CNT1 set in the counter 62 is increased from "2" to "6". Thus, in time t34 to time t38, the time period during which the drive signal Vdr is high is decreased from "⅝" to "⅛" of the duration of the time period TB.

At the timing of time t39 and time t40, the count value to be set in the counter 62 is "7". Thus, until the count value "6" is set in the counter 62 at time t41, the drive signal Vdr remains low. From time t41 until t47, the initial count value CNT1 to be set in the counter 62 is decreased from "6" to "0". Thus, the time period during which the drive signal Vdr is high is increased from "⅛" to "⅞" of the duration of the time period TB. When the signal Vssw goes low again, the drive signal Vdr, whose duty ratio coincides with the duty ratio of the PWM signal Vpwm, is output in the same manner as in the time period from time t30 to time t31.

As such, when the signal Vssw is high, the duty ratio of the drive signal Vdr is gradually decreased, and after reaching zero, it is gradually increased. In this case, the duty ratio of the drive signal Vdr does not exceed that of the PWM signal Vpwm.

<Operation of Motor Drive IC 10>

Figure 16:
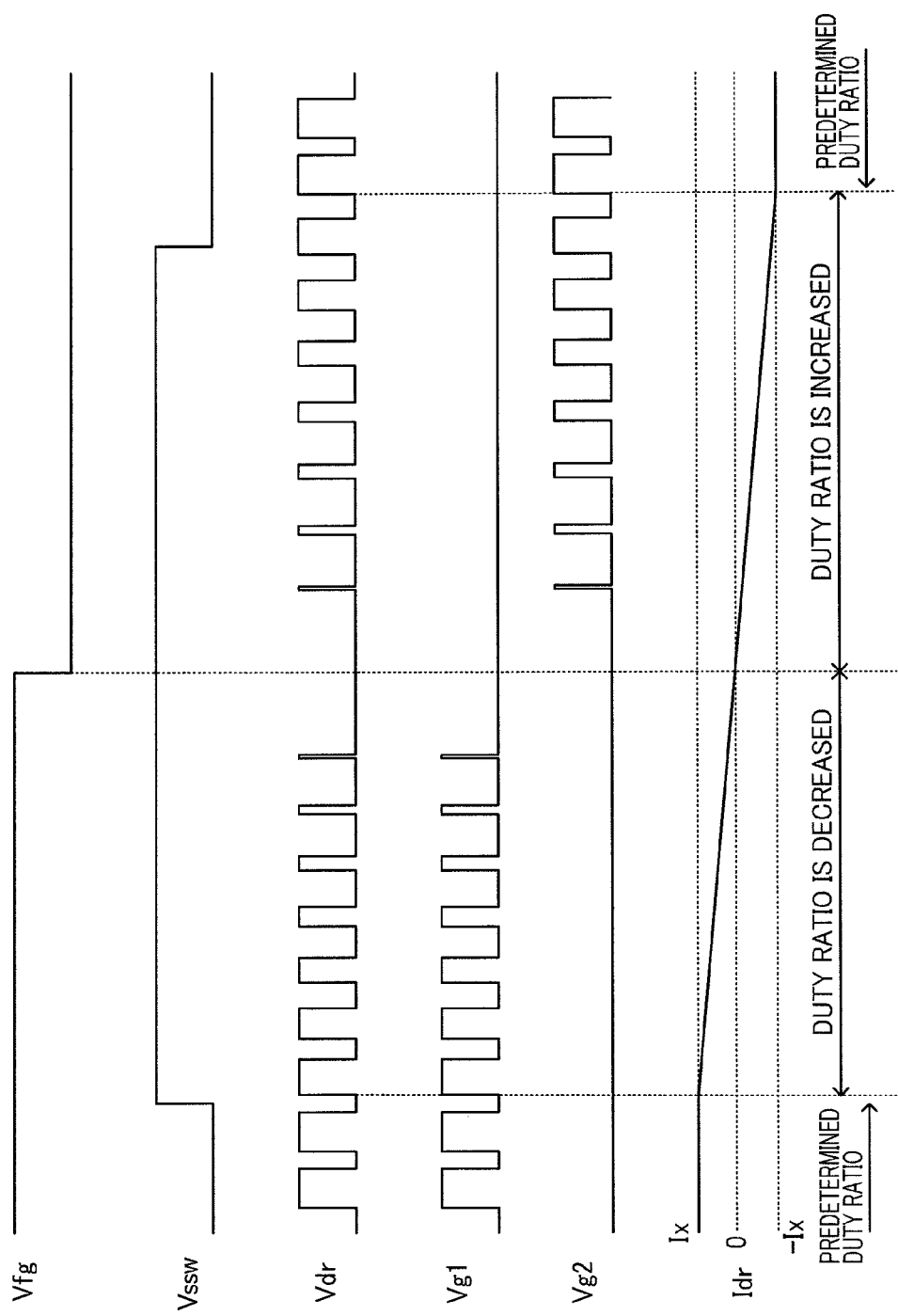
FIG. 16 is a diagram illustrating an operation of a motor drive IC 10.

A description will hereinafter be given of an operation of the motor drive IC 10 with reference to FIGS. 1 and 16. The gate voltage of the NMOS transistor 25B is given as voltage Vg1, and the gate voltage of the NMOS transistor 25A being given as voltage Vg2. It is assumed that the PWM signal Vpwm with a predetermined duty ratio D1 is input to the motor drive IC 10. Further, the current value of the drive current Idr when switching is performed for the NMOS transistor 25B based on the PWM signal Vpwm with the duty ratio D1 is given as Ix, and the current value of the drive current Idr when switching is performed for the NMOS transistor 25A is given as −Ix.

When the hall signals VH1 and VH2, whose frequencies are in accordance with the rotation speed of the single-phase motor 11, are input to the motor drive IC 10, the signal Vssw goes high around the timing of changing of the logic level of the signal Vfg, as described above. In the case where the signal Vssw is low, the duty ratio of the drive signal Vdr to be output from the drive signal generating circuit 23 is the duty ratio D1. Thus, the switching circuit 24 performs PWM driving of the NMOS transistor 25B with the duty ratio D1. Therefore, the current value of the drive current Idr during this time period results in Ix.

When the signal Vssw goes high and the soft-switching period starts, the duty ratio of the drive signal Vdr is lowered. Thus, the time period during which the voltage Vg1 is high is shortened and the current value of the drive current Idr is gradually decreased. In the time period during which the signal Vfg is high, the drive current Idr flows in the direction from the terminal 33 to the terminal 34, although the current value of the drive current Idr is decreased.

When the signal Vfg goes low, the switching circuit 24 performs the PWM driving of the NMOS transistor 25A according to the duty ratio of the drive signal Vdr so that the drive current Idr flows in the direction from the terminal 34 to the terminal 33. In this case, since the duty ratio of the drive signal Vdr is increased, the time period during which the voltage Vg2 is high is gradually increased. Thus, the current value of the drive current Idr is gradually increased, which flows in the direction from the terminal 34 to the terminal 33. After the signal Vssw goes low and the soft-switching period ends, the duty ratio of the drive signal Vdr reaches a predetermined value. As a result, the current value of the drive current Idr results in −Ix. Thereafter, the operation is repeated in the same manner in the motor drive IC 10.

The description has hereinafter be given of the motor drive IC 10 according to an embodiment of the present invention. The count value setting circuit 64 sets the initial value of from "0" to "7" in the counter 62 for each period of the PWM signal Vpwm, in the time period, during which the drive current Idr is decreased, of the soft-switching period. The count value setting circuit 64 sets the initial value of from "7" to "0" in the counter 62 for each period of the PWM signal Vpwm, in the time period during which the drive current Idr is increased. As a result, in the soft-switching period, the duty ratio of the drive signal Vdr is decreased and thereafter is increased, and thus the current value of the drive current Idr is slowly changed from +Ix to −Ix. As such, the motor drive IC 10 is capable of changing the duty ratio of the drive signal Vdr without using a capacitor. That is, the motor drive IC 10 is capable of changing the drive current of the motor coil in a gradual manner without using the capacitor.

Although all of the count values to be set in the counter 62 in the soft-switching period may be stored in a memory, etc., for example, if the data volume of the count values to be set is increased, a large-capacity memory, etc., will be required. In an embodiment of the present invention, the count values to be initially set in the counter 62 in the soft-switching period are generated inside the count value output circuit 65. Thus, even if the data volume of the count values to be set is increased, for example, the chip area can be reduced.

In General, the soft-switching period, i.e., the time period during which the signal Vssw is high, varies with the rotation speed, etc., of the single-phase motor 11. Thus, it is difficult to change the duty ratio of the drive signal Vdr in the same manner in different soft-switching periods. In an embodiment of the present invention, however, the duty ratio of the drive signal Vdr is changed based on the number of times the pulse signal Vp3 is generated for each time period, which is equal to 1/16 of the time period during which the signal Vssw is high. Specifically, the duty ratio of the drive signal Vdr is decreased until the pulse signal Vp3 has been input to the up-counter 81 eight times. The duty ratio of the drive signal Vdr is increased from the time when the pulse signal Vp3 has been input to the up-counter 81 nine times until the time when the pulse signal Vp3 has been input thereto 16 times. Thus, it becomes possible to change the duty ratio of the drive signal Vdr in the same manner, independently of the time period during which the signal Vssw is high.

In an embodiment of the present invention, the duty ratio of the drive signal Vdr is reduced to zero when the pulse signal Vp3 has been input to the up-counter 81 eight times or nine times. Thus, the drive current Idr can be changed more slowly as compared to a case where the duty ratio of the drive signal Vdr is not reduced to zero.

In the case where the signal Vssw is low, i.e., not in the soft-switching period, "6" is set in the counter 62 as the count value CNT1. Since the count value CNT1 reaches "7" in such timing that the PWM signal Vpwm goes low, the drive signal Vdr from the drive signal generating circuit 23 also goes low. As such, the drive signal generating circuit 23 is capable of generating not only the drive signal Vdr whose duty ratio varies but also the drive signal Vdr whose duty ratio coincides with the duty ratio of the PWM signal Vpwm.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit configured to drive a motor coil based on duty ratio of a PWM signal, comprising:
    a first pulse signal generating circuit configured to generate a first pulse signal for each time period, the time period being equal to 1/n of a time period during which the PWM signal is at one logic level, wherein n is a natural number greater than zero;
    a counter configured to change a count value based on the first pulse signal;
    a drive signal output circuit configured to output a drive signal of one logic level when the count value is not a predetermined value, and output the drive signal of the other logic level when the count value reaches the predetermined value;
    a drive circuit configured to perform PWM driving for the motor coil based on the duty ratio of the drive signal; and
    a setting circuit configured to
        set, in the counter, such a count value as to decrease a current passing through the motor coil, for each period of the PWM signal, in a time period during which the current passing through the motor coil is decreased, and
        set, in the counter, such a count value as to increase the current passing through the motor coil, for each period of the PWM signal, in a time period during which the current passing through the motor coil is increased,
        out of a time period during which the current passing through the motor coil is changed in direction.

2. The motor drive circuit of claim 1, wherein the setting circuit includes:
    a generating circuit configured to
        generate such a count value that a difference between the count value and the predetermined value is decreased within a range not exceeding the n, as time elapses, in the time period during which the current passing through the motor coil is decreased, and
        generate such a count value that the difference between the count value and the predetermined value is increased within the range not exceeding the n, as time elapses, in the time period during which the current passing through the motor coil is increased; and
    a count value setting circuit configured to set, in the counter, the count value generated by the generating circuit for each period of the PWM signal.

3. The motor drive circuit of claim 2, further comprising:
    a second pulse signal generating circuit configured to generate a second pulse signal for each time period, the time period being equal to 1/m of the time period during which the current passing through the motor coil is changed in direction,
    wherein m is a natural number greater than zero and is two times n, and
    wherein the generating circuit
        generates such a count value that the difference between the count value and the predetermined value is decreased until a time when the second pulse signal is input k times, wherein k is a natural number greater than zero and is equal to n, and
        generates such a count value that the difference between the count value and the predetermined value is increased from a time when the second pulse signal is input k+1 times until a time when the second pulse signal is input the m times,
        in the time period during which the current passing through the motor coil is changed in direction.

4. The motor drive circuit of claim 3, wherein
    the generating circuit generates such a count value as to reach the predetermined value when the second pulse signal is input the k times or the k+1 times.

5. The motor drive circuit of claim 1, wherein
    the first pulse signal generating circuit
        generates the first pulse signal for each time period, which is equal to 1/n of the time period during which the PWM signal is at the one logic level, in the time period during which the current passing through the motor coil is changed in direction; and
        generates the first pulse signal each time the PWM signal is changed from the one logic level to the other logic level, in a time period during which the current passing through the motor coil is not changed in direction, and wherein
    the setting circuit sets, in the counter, such a count value as to reach the predetermined value when the first pulse signal is input to the counter, for each period of the PWM signal, in the time period during which the current passing through the motor coil is not changed in direction.

* * * * *